US008968462B2

United States Patent
Ahrens

(10) Patent No.: US 8,968,462 B2
(45) Date of Patent: Mar. 3, 2015

(54) INORGANIC PIGMENT DISPERSIONS CONTAINING FATTY ACID ETHANOL AMIDE ETHOXYLATES AND AMINES

(71) Applicant: Hendrik Ahrens, Kriftel (DE)

(72) Inventor: Hendrik Ahrens, Kriftel (DE)

(73) Assignee: Clariant Finance (BVI) Limited, Tortola (BV)

( * ) Notice: Subject to any disclaimer, the term of this patent is extended or adjusted under 35 U.S.C. 154(b) by 0 days.

(21) Appl. No.: 14/370,168

(22) PCT Filed: Dec. 19, 2012

(86) PCT No.: PCT/EP2012/005266
§ 371 (c)(1),
(2) Date: Jul. 1, 2014

(87) PCT Pub. No.: WO2013/104406
PCT Pub. Date: Jul. 18, 2013

(65) Prior Publication Data
US 2015/0000566 A1    Jan. 1, 2015

(30) Foreign Application Priority Data

Jan. 13, 2012 (DE) .......................... 10 2012 000 555
May 9, 2012 (DE) .......................... 10 2012 009 239

(51) Int. Cl.
| | | |
|---|---|---|
| C09D 17/00 | (2006.01) | |
| C09B 67/00 | (2006.01) | |
| C08K 5/16 | (2006.01) | |
| C08K 5/17 | (2006.01) | |
| C08K 5/20 | (2006.01) | |
| C08K 5/22 | (2006.01) | |
| C08K 3/22 | (2006.01) | |
| C08K 3/04 | (2006.01) | |

(52) U.S. Cl.
CPC ... *C08K 5/22* (2013.01); *C08K 3/22* (2013.01); *C08K 5/20* (2013.01); *C08K 5/17* (2013.01); *C08K 3/04* (2013.01); *C08K 2003/2272* (2013.01); *C08K 2003/2241* (2013.01); *C08K 2003/2251* (2013.01); *C08K 2003/2227* (2013.01)
USPC ........... 106/499; 106/414; 106/420; 106/429; 106/448; 106/453; 106/460; 106/479; 106/480; 106/504; 524/186

(58) Field of Classification Search
USPC ......... 106/414, 420, 429, 448, 453, 460, 479, 106/480, 499, 504; 524/186
See application file for complete search history.

(56) References Cited

U.S. PATENT DOCUMENTS

| | | | | | |
|---|---|---|---|---|---|
| 2,192,956 | A | * | 3/1940 | Sloan et al. ................... | 106/447 |
| 3,015,573 | A | * | 1/1962 | Myers et al. .................. | 106/448 |
| 3,172,772 | A | * | 3/1965 | Rowe ............................ | 106/445 |
| 3,775,148 | A | * | 11/1973 | Bradley ....................... | 106/496 |
| 3,945,964 | A | * | 3/1976 | Hastings et al. .............. | 523/406 |
| 4,091,164 | A | * | 5/1978 | Schwarz ....................... | 428/404 |
| 4,127,420 | A | * | 11/1978 | Harris et al. .................. | 106/412 |
| 4,156,616 | A | * | 5/1979 | Dietz et al. ................... | 106/503 |
| 4,439,238 | A | * | 3/1984 | Pigasse ....................... | 106/31.03 |

(Continued)

FOREIGN PATENT DOCUMENTS

| | | | | | |
|---|---|---|---|---|---|
| DE | 19743841 | A1 | * | 4/1999 | ............... C09D 7/02 |
| DE | 10341724 | A1 | * | 4/2005 | ............ C07C 43/184 |

(Continued)

OTHER PUBLICATIONS

International Search Report from PCT/EP2012/005266 (Apr. 2013).*

(Continued)

*Primary Examiner* — Anthony J Green
(74) *Attorney, Agent, or Firm* — Tod A. Waldrop

(57) ABSTRACT

The subject matter of the invention relates to aqueous pigment preparations containing (A) 30 to 75% by weight of at least one inorganic white or colored pigment or a mixture of different inorganic white or colored pigments, (B) 0.01 to 15% by weight of at least one fatty acid ethanol amide ethoxylate of the formula (I),

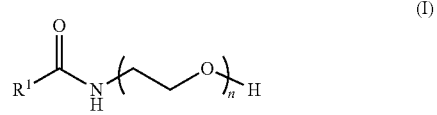

(I)

in which $R^1$ is a linear or branched alkyl radical or alkenyl radical with 7 to 21 carbon atoms, and n is a whole number from 2 to 40, (C) 0.01 to 5% by weight of at least one amine of the formula (II),

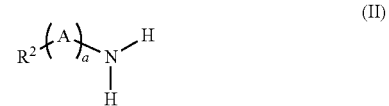

(II)

in which $R^2$ is a linear or branched alkyl radical or alkenyl radical with 8 to 22 carbon atoms, identical to or different from $R^1$, A represents an iminopropyl group —NH—$CH_2$—$CH_2$—$CH_2$—, an oxyethyl group —O—$CH_2$—$CH_2$— or an oxypropyl group —O—$CH_2$—$CH(CH_3)$—$CH_2$—, and a is a whole number from 0 to 5, wherein the compound of the formula (II); can be present in the form of an ammonium salt, and (E) water.

18 Claims, No Drawings

(56) References Cited

U.S. PATENT DOCUMENTS

| | | | |
|---|---|---|---|
| 4,563,221 A * | 1/1986 | Humphreys | 106/448 |
| 4,599,114 A * | 7/1986 | Atkinson | 106/448 |
| 4,785,088 A * | 11/1988 | Flohr et al. | 540/127 |
| 4,851,549 A * | 7/1989 | Flohr et al. | 549/206 |
| 4,937,338 A * | 6/1990 | Flohr et al. | 544/64 |
| 5,382,288 A * | 1/1995 | Schenk et al. | 106/496 |
| 6,224,884 B1 * | 5/2001 | Remy | 424/401 |
| 6,231,662 B1 * | 5/2001 | Atkinson | 106/499 |
| 6,287,348 B1 * | 9/2001 | Bruhnke | 8/543 |
| 6,312,514 B1 * | 11/2001 | Schulte et al. | 106/499 |
| 6,348,092 B1 * | 2/2002 | Atkinson | 106/505 |
| 6,379,443 B1 * | 4/2002 | Komatsu et al. | 106/31.58 |
| 6,471,764 B1 * | 10/2002 | Robertson et al. | 106/493 |
| 6,488,759 B1 * | 12/2002 | Hays | 106/496 |
| 6,582,505 B1 * | 6/2003 | Bouvy et al. | 106/410 |
| 6,689,731 B2 * | 2/2004 | Esselborn et al. | 510/288 |
| 7,008,475 B2 * | 3/2006 | Randler et al. | 106/31.27 |
| 7,494,969 B2 * | 2/2009 | Ferrandis et al. | 514/1.1 |
| 7,608,653 B2 * | 10/2009 | Wulff et al. | 524/366 |
| 2003/0101910 A1 * | 6/2003 | Godwin et al. | 106/499 |
| 2004/0040471 A1 * | 3/2004 | Winter et al. | 106/499 |
| 2005/0080159 A1 * | 4/2005 | Omoto et al. | 523/122 |
| 2007/0125260 A1 * | 6/2007 | Grimm et al. | 106/31.6 |
| 2010/0216960 A1 * | 8/2010 | Ahrens et al. | 526/278 |
| 2010/0300327 A1 * | 12/2010 | Sasada et al. | 106/400 |

FOREIGN PATENT DOCUMENTS

| | | | | |
|---|---|---|---|---|
| EP | 690044 A2 * | 1/1996 | | C07C 231/12 |
| EP | 1167452 A2 * | 1/2002 | | C08L 71/02 |
| EP | 1754757 A1 * | 2/2007 | | C09D 7/14 |
| EP | 1771520 B1 * | 9/2008 | | C09D 5/00 |
| EP | 2193152 B1 * | 8/2011 | | C08F 220/28 |
| GB | 791767 A * | 3/1958 | | |
| GB | 1080115 A * | 8/1967 | | C09D 7/14 |
| WO | WO2012/123082 A2 * | 9/2012 | | C09D 5/02 |

OTHER PUBLICATIONS

English Translation of International Preliminary Report on Patentability and Written Opinion from PCT/EP2012/005266 (Jul. 2014).*

* cited by examiner

INORGANIC PIGMENT DISPERSIONS CONTAINING FATTY ACID ETHANOL AMIDE ETHOXYLATES AND AMINES

The present invention provides aqueous pigment dispersions comprising fatty acid ethanolamide ethoxylates and amines as surface modifiers and dispersants, and to the use thereof for coloring all kinds of macromolecular materials, for example fiber materials, paper stock coloring, coating compositions, lacquers, paints, and the use thereof for printing of two-dimensional sheetlike structures, for example paper, cardboard, plastics, textiles and leather.

For the coloring of macromolecular materials, especially of paints and lacquers, aqueous pigment preparations comprising organic or inorganic pigments are produced.

For the production of aqueous pigment preparations comprising inorganic pigments, according to the desired color intensity of the pigment preparations, pigments are used in a concentration range from 1 to 75% by weight. In addition, these aqueous pigment preparations typically comprise wetting agents and dispersants and water, and also optionally auxiliaries customary for pigment preparations, for example additionally solvents, humectants, preservatives, defoamers, pH regulators and rheological additives which serve as antisettling agents.

The wetting agents and dispersants for inorganic pigments have the task of wetting and dispersing the pigments, and of stabilizing the pigment preparations.

According to the prior art, polymeric dispersants and anionic, cationic and nonionic surfactants are used to disperse and inorganic pigments in aqueous dispersions or to modify the surface of the inorganic and organic pigments.

The polymeric dispersants used are typically low molecular weight polymers of acrylic acid or copolymers of acrylic acid, methacrylic acid and maleic acid, and the sodium, potassium or ammonium salts thereof.

The anionic surfactants used are amphiphilic compounds wherein the hydrophobic group is an aliphatic or aromatic radical and the hydrophilic group contains a carboxylic acid, sulfonic acid or phosphonic acid group or is an ester of sulfuric acid or phosphoric acid.

Nonionic surfactants which find use as dispersants for pigment preparations are stated to be fatty alcohol ethoxylates, alkylphenol ethoxylates and copolymers of ethylene oxide, propylene oxide and styrene oxide.

Cationic surfactants used as dispersants for pigment preparations are amines, the ammonium salts thereof, amine oxides, betaines or quaternary ammonium compounds. More particularly, long-chain aliphatic alkylamines and alkyldiamines are described for a multitude of applications in which the dispersibility of inorganic pigments in polymers, in aqueous and solvent-containing coating compositions, or in the processing of paper, cardboard, plastics, textiles or leather, is improved.

There follows an overview of the dispersants used according to the prior art.

DE-10341724 describes alkali-resistant alkoxylates as dispersants for coating materials and color formulations.

DE-19743841 describes mixtures of polyphosphates and polyacrylates in the form of the alkali metal or ammonium salts as dispersants for inorganic pigments and fillers in emulsion paints.

EP-1167452 describes the use of block copolymers or phosphoric esters and salts thereof as pigment wetting agents for pigment pastes, and aqueous, solvent-containing, low-solvent and solvent-free coating materials and printing inks. The phosphoric ester block copolymers are prepared by blockwise reaction of alkylol with styrene oxide, ethylene oxide, and optionally with further alkylene oxides, and then converted to the phosphoric ester.

EP-1771520 describes alcohol alkoxylates as low-foam wetting agents for coating compositions composed of binders, pigments, fillers, additives and solvents.

EP-2193152 describes anionic dispersants from the group of the fatty acids and salts thereof, sodium alkylbenzenesulfonates, sodium alkylsulfonates, sodium olefinsulfonates, sodium polynaphthalenesulfonates, alkyl sulfates, alkyl polyethylene glycol ether sulfates, alkylphenol polyethylene glycol ether sulfates, sulfosuccinic esters and alkyl polyethylene glycol ether phosphoric esters.

GB-791767 describes polymers and copolymers of acrylic acid and methacrylic acid and the esters and salts thereof as dispersants for inorganic pigments.

GB-1080115 describes the use of long-chain alkylamines having 8 to 20 carbon atoms, and the salts and ethoxylates thereof, as surface modifiers in the synthesis of organic pigments.

U.S. Pat. No. 2,192,956 describes the use of amines and quaternary ammonium compounds as dispersants for organic pigments.

U.S. Pat. No. 3,015,573 and U.S. Pat. No. 3,172,772 describe the use of low molecular weight ammonium salts as surface modifiers for titanium dioxide pigments.

U.S. Pat. No. 3,775,148 describes aliphatic amines, amine salts and amine oxides having 1 to 20 carbon atoms as surface modifiers for diarylide pigments.

U.S. Pat. No. 3,945,964 describes alcohol alkoxylates as dispersants for aqueous epoxy resin dispersions.

U.S. Pat. No. 4,091,164 describes ethylene oxide/propylene oxide block copolymers as dispersants for inorganic pigments and fillers in thermoplastics.

U.S. Pat. No. 4,127,420 describes alkoxylates and amines containing alkyl groups as dispersants for organic pigments.

U.S. Pat. No. 4,156,616 describes the use of long-chain aliphatic amine ethoxylates for aqueous dispersions comprising organic and inorganic pigments.

U.S. Pat. No. 4,439,238 describes aliphatic and alicyclic amines and diamines having 1 to 22 carbon atoms for phthalocyanine pigments.

U.S. Pat. No. 4,563,221 describes the use of fatty amines as dispersants for inorganic pigments in polymers.

U.S. Pat. No. 4,599,114 describes the use of fatty alkyl propylenediamines for the surface treatment of titanium dioxide and other inorganic pigments for dispersion in coating compositions and plastics and for papermaking.

U.S. Pat. No. 5,382,288 describes the use of amides, diamines and long-chain primary and secondary alkylamines for the modification of organic azo pigments.

U.S. Pat. No. 6,231,662 describes the use of reaction products of low molecular weight amines and fatty amines with dicarboxylic acids as surface modifiers for organic and inorganic pigments.

U.S. Pat. No. 6,287,348 describes the reaction of $O_{12}$—$C_{24}$ alkylamines and $C_{12}$-$C_{24}$ alkyl monoether amines with reactive dyes for production of colorants for hydrocarbons and waxes.

U.S. Pat. No. 6,312,514 describes diol alkoxylates as dispersants for aqueous pigment concentrates.

U.S. Pat. No. 6,348,092 describes the use of diamines and alkyl ether amines as dispersants for titanium dioxide in mineral oil-containing alkyd lacquers.

U.S. Pat. No. 6,379,443 describes alkyl alkoxylates as dispersants for inkjet inks.

U.S. Pat. No. 6,471,764 describes polyalkylene glycol ether amines as dispersing additives for organic pigments.

U.S. Pat. No. 6,488,759 describes alkyl polypropyleneamines as dispersants and surface modifiers for organic monoarylide pigments.

U.S. Pat. No. 6,582,505 describes branched alcohol alkoxylates as dispersants for aqueous pigment dispersions.

U.S. Pat. No. 7,008,475 describes naphthol alkoxylates as dispersants for organic pigments.

US-2003/101910 describes carboxymethylated and phosphated polystyrenephenol alkoxylates as dispersants for carbon black dispersions.

US-2004/040471 describes reaction products of fatty amines as auxiliaries for the production of aqueous pigment preparations.

US-2007/125260 describes the use of primary and secondary fatty amines as dispersants for azo pigments.

US-2008/110368 describes a paint formulation composed of a pigment powder and nonionic surfactants selected from the group of the acetylene surfactants, alkylphenol ethoxylates, ethylene oxide/propylene oxide block copolymers, alcohol ethoxylates and mixtures thereof.

Even though the prior art proposes a multitude of compounds as suitable wetting agents and dispersants, there is in practice a constant lack of effective dispersants for pigment dispersions that meet demands on sedimentation stability, rheological characteristics, color yield of the pigments, and a low level of human and ecological toxicology.

Furthermore, awarding guidelines for environmental seals of approval restrict the use of known wetting agents and dispersants, and so the person skilled in the art is constantly looking for new dispersants and combinations to produce fluid, stable, aqueous pigment preparations. It is desirable to produce aqueous pigment preparations which do not require labeling pursuant to European Directive 2008-1272 EC.

It was an object of the present invention to produce stable and free-flowing aqueous pigment preparations which do not require labeling pursuant to European Directive 2008-1272 EG, and which do not show any sedimentation of the pigments used over a prolonged period, and with which aqueous and solventborne paints, varnishes and glazes can equally be colored. In the tinting of aqueous lacquers and paints, especially emulsion paints, silicate emulsion paints and aqueous silicone resin paints, the inventive pigment preparations should not show any rubout problems.

It has been found that, surprisingly, pigment preparations comprising fatty acid ethanolamide ethoxylates of the formula I in combination with amines of the formula II achieve this object.

The invention therefore provides aqueous pigment preparations comprising (A) 30 to 75% by weight of at least one inorganic white pigment or chromatic pigment or a mixture of various inorganic white pigments or chromatic pigments, (B) 0.01 to 15% by weight of at least one fatty acid ethanolamide ethoxylate of the formula (I),

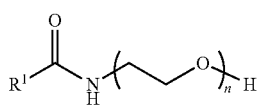

in which
$R^1$ is a linear or branched alkyl or alkenyl radical having 7 to 21 carbon atoms,
n is an integer from 2 to 40, (C) 0.01 to 5% by weight of an amine of the formula (II)

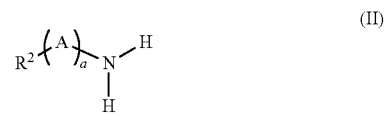

in which
$R^2$ is a linear or branched alkyl or alkenyl radical having 8 to 22 carbon atoms, the same as or different than $R^1$,
A is an iminopropyl group —NH—$CH_2$—$CH_2$—$CH_2$—, an oxyethyl group —O—$CH_2$—$CH_2$— or an oxypropyl group —O—$CH_2$—$CH(CH_3)$—$CH_2$—
and
a is an integer from 0 to 5,
where the compound of the formula (II) may be in the form of an ammonium salt, and (E) water.

The inventive pigment preparation may additionally comprise (D) optionally 0 to 30% by weight of further auxiliaries customary for the production of aqueous pigment preparations, such as additional wetting agents, anionic dispersants, humectants, solvents, defoamers, rheology additives, preservatives, buffer substances, pH regulators.

The inventive pigment preparations are shear-resistant, drying-resistant and storage-stable, foam only slightly, if at all, on application, and have excellent rheology.

Component (A) of the inventive pigment preparations is preferably a finely divided, inorganic white pigment or chromatic pigment, or a mixture of various inorganic pigments. Suitable inorganic pigments are, for example, titanium dioxides, zinc sulfides, zinc oxides, iron oxides, magnetites, manganese iron oxides, chromium oxides, ultramarine, nickel antimony titanium oxides or chromium antimony titanium oxides, manganese titanium rutiles, cobalt oxides, mixed oxides of cobalt and aluminum, rutile mixed phase pigments, sulfides of the rare earths, spinels of cobalt with nickel and zinc, spinels based on iron and chromium with copper, zinc and manganese, bismuth vanadates and extender pigments. More particularly, the Color Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33 and Pigment White 6 are used. Preferably, mixtures of inorganic pigments are also frequently used. Mixtures of organic with inorganic pigments are likewise frequently used.

Component (B) of the inventive pigment preparations is a fatty acid ethanolamide ethoxylate of the formula 1. $R^1$ therein comprises preferably 11 to 19 carbon atoms. n is preferably at least 3, especially at least 4. It is preferably prepared by reaction of fatty acids with ethanolamine to give the fatty acid ethanolamide and subsequent addition of ethylene oxide by means of alkaline catalysts such as sodium methoxide or potassium methoxide. Proceeding from the fatty acid ethanolamide, ethylene oxide is preferably added onto the terminal hydroxyl group. The addition of ethylene oxide onto the nitrogen of the acid amide group proceeds to a minor degree in a side reaction, such that 2 polyethylene glycol ether radicals may also be bonded to the nitrogen of the acid amide group to a lesser extent. Suitable fatty acids for the preparation of the fatty acid ethanolamides are capric acid, lauric acid, myristic acid, palmitic acids, margaric acid, stearic acid, arachic acid, behenic acid, palmitoleic acid, oleic acid, and naturally occurring mixtures such as palm kernel oil fatty acid, rapeseed oil fatty acid, sunflower oil fatty acid, soybean oil fatty acid, or resin acids such as tall oil fatty acid. The fatty acids used as raw material may be in saturated and unsaturated form.

Component (C) of the inventive pigment preparations, in one embodiment, is a primary amine selected from the group of the primary fatty amines having 8 to 22 carbon atoms, for example octylamine, decylamine, dodecylamine, tetradecylamine, coconut oil amine, soybean oil amine, stearylamine, oleylamine, tallowalkylamine or behenylamine. $R^2$ preferably comprises 12 to 20 carbon atoms. In addition, component (C) may be an alkylaminopropylamine preparable by addition of acrylonitrile onto a primary fatty amine and hydrogenation. More particularly, it is possible to use laurylaminopropylamine, oleylaminopropylamine and tallowkylaminopropylamine. Further amines (C) suitable for the inventive pigment preparations are ether amines which can be prepared by aminolysis of fatty alcohol ethoxylates. Suitable ether amines are, for example, lauryloxethylamine, lauryldioxethylamine, isotridecyloxethylamine, isotridecyldioxethylamine and isotridecylpentaoxethylamine.

Component (C) may also be present in the form of ammonium salts thereof, which can be prepared by neutralization with customary organic and inorganic acids. Customary acids may, for example, be hydrochloric acid, sulfuric acid, methanesulfonic acid, phosphoric acid, formic acid, acetic acid, propionic acid, lactic acid, oxalic acid, benzenesulfonic acid, toluenesulfonic acid, xylenesulfonic acid, cumenesulfonic acid and fatty acids having 6 to 22 carbon atoms.

Components (D) are further auxiliaries suitable for the production of aqueous pigment preparations, such as additional wetting agents, anionic dispersants, humectants, solvents, defoamers, rheology additives, preservatives, buffer substances and pH regulators.

Additional wetting agents may be wetting agents based on polysiloxane ethers, for example a methoxy polyethoxypropyltrisiloxane, alkynediol ethoxylates and fluoro surfactants.

Suitable anionic dispersants are preferably anionic surfactants from the group of the sodium, potassium and ammonium salts of fatty acids, alkylbenzenesulfonates, alkylsulfonates, olefinsulfonates, polynaphthalenesulfonates, alkyl sulfates, alkyl polyethylene glycol ether sulfates, alkylphenol polyethylene glycol ether sulfates, sulfosuccinic esters, alkyl polyethylene glycol ether phosphates, alkyl polyethylene glycol ether carboxylates and salts thereof, sulfuric monoesters and phosphoric esters of styrene-substituted phenol ethoxylates, styrene-substituted phenol polyethylene glycol ether carboxylic acids and salts thereof, sodium fatty acid isethionates, sodium fatty acid methyl taurides and sodium fatty acid sarcosides.

Suitable humectants and solvents are preferably glycol ethers, which are preferably understood here to mean compounds having ethoxy and/or propoxy groups, which have molar masses between 200 and 20 000 g/mol, especially polyethylene glycol ethers or polypropylene glycol ethers having a mean molar mass between 200 and 20 000 g/mol, mono-, di- or triethylene glycol, mono-, di- or tripropylene glycol, methyl, ethyl, propyl, butyl or higher alkyl polyalkylene glycol ethers having 1, 2, 3 or more ethylene glycol or propylene glycol units, for example methoxypropanol, dipropylene glycol monomethyl ether, tripropylene glycol monomethyl ether, ethylene glycol monobutyl ether, diethylene glycol monobutyl ether, butyl polyethylene glycol ether, propyl polyethylene glycol ether, ethyl polyethylene glycol ether, methyl polyethylene glycol ether, dimethyl polyethylene glycol ether, dimethyl polypropylene glycol ether, glyceryl ethoxylates having a molecular weight of 200 to 20 000 g/mol, pentaerythritol alkoxylates having a molecular weight of 200 to 20 000 g/mol, or further ethoxylation and alkoxylation products and random or block copolymers which have been prepared by addition of ethylene oxide and/or propylene oxides onto monohydric and polyhydric alcohols, having a molecular weight of 200 to 20 000 g/mol. Molar mass/molecular weight means number-average molar mass/molecular weight.

Further suitable auxiliaries in the inventive aqueous pigment preparations are preferably water-soluble organic or hydrotropic substances which optionally also serve as solvents. Particularly suitable examples are formamide, urea, tetramethylurea, ε-caprolactam, glycerol, diglycerol, polyglycerol, N-methylpyrrolidone, 1,3-diethyl-2-imidazolidinone, thiodiglycol, sodium benzenesulfonate, sodium xylenesulfonate, sodium toluenesulfonate, sodium cumenesulfonate, sodium dodecylsulfonate, sodium benzoate, sodium salicylate, sodium butyl monoglycol sulfate.

Suitable defoamers are preferably mineral oil defoamers and emulsions thereof, silicone oil defoamers and silicone oil emulsions, polyalkylene glycols, polyalkylene glycol fatty acid esters, fatty acids, higher polyhydric alcohols, phosphoric esters, hydrophobically modified silica, aluminum tristearate, polyethylene waxes and amide waxes.

Suitable rheological additives as viscosity regulators are, for example, starch and cellulose derivatives and hydrophobically modified ethoxylated urethane (HEUR) thickeners, alkali-swellable acrylate thickeners, hydrophobically modified acrylate thickeners, polymers of acrylamidomethylpropanesulfonic acid, bentonite thickeners or fumed silica.

In-can preservatives are added to stabilize the aqueous pigment preparations, and to prevent the uncontrolled multiplication of bacteria, algae and fungi. Suitable biocides are formaldehyde, formaldehyde-releasing components, methylisothiazolinone, chloromethylisothiazolinone, benzisothiazolinone, bronopol, dibromodicyanobutane and silver chloride-coated titanium dioxide.

The buffer substances and pH regulators used are preferably organic or inorganic bases and acids. Preferred organic bases are amines, for example ethanolamine, diethanolamine, triethanolamine, N,N-dimethylethanolamine, diisopropylamine, 2-amino-2-methyl-1-propanol or dimethylaminomethylpropanol. Preferred inorganic bases are sodium hydroxide, potassium hydroxide, lithium hydroxide or ammonia.

Water used for production of the inventive aqueous pigment preparations, component (E), is preferably used in the form of distilled or demineralized water. It is also possible to use drinking water (tap water) and/or water of natural origin. Water is present in the inventive aqueous pigment preparations preferably to an extent of 10 to 65% by weight, especially to make them up to 100% by weight.

The inventive aqueous pigment preparations preferably have a viscosity of 10 to 10 000 mPas, preferably 50 to 5000 mPas and more preferably 300 to 3000 mPas, measured with a cone-plate viscometer at a shear rate of $1/60$ sec$^{-1}$, for example a Haake 550 viscometer from Thermo Haake.

The inventive aqueous pigment preparations are miscible in any ratio with water, and it is also possible to mix a plurality of different preparations with water. Compared to conventional pigment preparations, they are notable for excellent storage stability and good rheological properties.

The present invention also provides a process for producing the inventive pigment preparations, by dispersing component (A) in the form of powder or granules in the presence of water (E) and/or components (B), (C) and any (D) in a manner customary per se, then optionally adding further water (E) and adjusting the resultant aqueous pigment dispersion to the desired concentration with water. Preferably, components (B), (C), any (D) and (E) are mixed and homogenized, then component (A) is stirred into the initially charged mixture, in the course of which the pigment is converted to a paste and predispersed. According to the particle hardness of the pigments are used, this is optionally followed by fine dispersion or fine distribution, while cooling, with the aid of a grinding or dispersing unit. For this purpose, it is possible to use stirrer systems, dissolvers (sawtooth stirrers), rotor-stator mills, ball mills, stirred ball mills such as sand mills and bead mills, high-speed mixers, kneading apparatuses, roll mills or high-performance bead mills. The fine dispersion or grinding of the pigments is effected down to the desired particle size distribution, and can be effected at temperatures in the range from 0 to 100° C., appropriately at a temperature between 10 and 70° C., preferably at 20 to 60° C. After the fine dispersion, the pigment preparation can be diluted further with water, preferably deionized or distilled water.

The inventive pigment preparations are suitable for pigmentation and coloring of all kinds of macromolecular materials. The inventive pigment preparations are particularly suitable for pigmentation or production of emulsion paints and other paints, dispersion-based coating materials, printing inks (for example textile printing, flexographic printing, decorative printing or intaglio printing inks), wallpaper inks, water-thinnable coating materials, woodstains, wood preservative systems, and coating materials for surface coating of articles made, for example, from metal, wood, plastic, glass, ceramic, concrete, textile material, paper or rubber.

A further advantage of the inventive fatty acid ethanolamide ethoxylates is the labeling of the mixtures pursuant to European Directive 2008-1272 EC on classification, labelling and packaging of substances and mixtures. This directive 2008-1272 EC stipulates, within the European Union, that mixtures containing >1% of a corrosive surfactant or >3% of an irritant surfactant are classified as a hazardous substance. It is therefore advantageous to use surfactants having no irritant or corrosive effect on the skin or mucous membrane. A multitude of nonionic surfactants, such as the oleyl/cetyl ethoxylate used in example 2 (comparative example), causes severe eye damage. This leads to hazard labeling of the pigment preparations according to example 2, while the fatty acid ethanolamide ethoxylate used in example 1 and also the mixture, according to directive 2008-1272 EC, is not classified as hazardous.

EXAMPLES

Production of a Pigment Preparation

The pigment, in the form of powder, granules or a presscake, together with the dispersants and the other additives, is converted to a paste in deionized water and then homogenized and predispersed with a dissolver (for example from VMA-Getzmann GmbH, AE3-M1 type) or another suitable apparatus. The subsequent fine dispersion is effected with the aid of a bead mill (for example AE3-M1 from VMA-Getzmann) or else another suitable dispersing unit, the grinding being effected with siliquartzite beads or mixed zirconium oxide beads of size d=1 mm with cooling, until the desired color intensity and color properties are attained. Thereafter, the dispersion is adjusted to the desired final pigment concentration with deionized water, the grinding bodies are removed and the pigment preparation is isolated.

The pigment preparations described in the examples which follow were produced by the process described above, and the constituents which follow were used in the amounts specified so as to form 100 parts of the respective pigment preparation. In the present application, "parts" mean parts by weight and percentages mean percent by weight, unless stated otherwise in the specific case.

Example 1

| | |
|---|---|
| 70 parts | C.I. Pigment Red 101 (Bayferrox ® Red 130, from Lanxess, component (A)), |
| 4 parts | tall oil fatty acid ethanolamide reacted with 5 mol of ethylene oxide (component (B)), |
| 0.6 part | tallowalkylamine (Genamin ® TA 100, from Clariant, component (C)), |
| 10 parts | polyethylene glycol having a molecular weight of 200 g/mol (Polyglykol 200 USP, from Clariant, component (D)), |
| 0.2 part | acetic acid, 99% (component (D)), |
| 0.3 part | defoamer (D-Foam-R C 741, from Clariant, component (D)), |
| 0.2 part | preservative (Nipacide ® BSM, from Clariant, component (D)), |
| 14.7 parts | water (component (E)) |

In a grinding vessel, components (B), (C), (D) and (E) are initially charged and mixed. Subsequently, the pulverulent component (A) is added and predispersed with the dissolver. The fine dispersion is effected in a bead mill by means of mixed zirconium oxide beads of size d=1 mm while cooling. Subsequently, the grinding bodies are removed and the pigment preparation is isolated. The pigment preparation is stored at 60° C. for one week and assessed visually. The viscosity of the pigment preparation is measured with a Haake 550 viscometer at a shear rate of $\frac{1}{60}$ sec$^{-1}$.

After storage at 60° C. for one week, the pigment preparation is fluid, homogeneous and foam-free. The viscosity of the pigment preparation is 1679 mPa·s.

Example 2 (comparative example)

| | |
|---|---|
| 70 parts | C.I. Pigment Red 101 (Bayferrox Red 130, component (A)), |
| 4 parts | oleyl/cetyl ethoxylate with 8 mol of ethylene oxide (Genapol ® O 080, from Clariant, component (B)) |
| 0.6 part | tallowalkylamine (Genamin TA 100, from Clariant, component (C)), |
| 10 parts | polyethylene glycol having a molecular weight of 200 g/mol (Polyglykol 200 USP, from Clariant, component (D)), |
| 0.2 part | acetic acid, 99% (component (D)), |
| 0.3 part | defoamer (D-Foam-R C 741, from Clariant, component (D)), |
| 0.2 part | preservative (Nipacide ® BSM, from Clariant, component (D)), |
| 18 parts | water (component (E)) |

The procedure in the production and testing of the pigment preparation is as detailed under example 1. After grinding, the pigment preparation is a fluid, foam-free pigment dispersion. After storage at 60° C. for one week, the pigment preparation is fluid, homogeneous and foam-free. The viscosity of the pigment preparation is 1677 mPa·s. On the basis of European Directive 2008-1272 EC on classification, labelling and packaging of substances and mixtures, the pigment preparation according to example 2, however, would be subject to hazard labeling because the oleyl/cetyl ethoxylate used here can cause serious eye damage.

Example 3 (comparative example)

| | | |
|---|---|---|
| 70 parts | C.I. Pigment Red 101 (Bayferrox Red 130, component (A)), | |
| 1.5 parts | of an aqueous, 40% solution of a sodium polyacrylate having a mean molecular weight of 7000 g/mol in place of the combination of components (B) and (C), | |
| 10 parts | polyethylene glycol having a molecular weight of 200 g/mol (Polyglykol 200 USP, from Clariant, component (D)), | |
| 0.3 part | defoamer (D-Foam-R C 741, from Clariant, component (D)), | |
| 0.2 part | preservative (Nipacide BSM, from Clariant, component (D)), | |
| 18 parts | water (component (E)) | |

The procedure in the production and testing of the pigment preparation is as detailed under example 1. After grinding, the pigment preparation is a fluid, foam-free pigment dispersion. After storage at 60° C. for one week, the dispersion has stiffened to become a firm gel. By stirring, it is possible to liquefy the dispersion again, and it has a viscosity of 855 mPa·s, but the pigment dispersion, after further storage at room temperature for 4 weeks, solidifies again to a firm gel.

Example 4 (comparative example)

| | | |
|---|---|---|
| 70 parts | C.I. Pigment Red 101 (Bayferrox Red 130, component (A)), | |
| 4 parts | EO/PO block copolymer with 20% ethylene oxide (Genapol PF 20, from Clariant, component (B)), | |
| 0.6 part | tallowalkylamine (Genamin TA 100, from Clariant, component (C)), | |
| 10 parts | polyethylene glycol having a molecular weight of 200 g/mol (Polyglykol 200 USP, from Clariant, component (D)), | |
| 0.2 part | acetic acid, 99% (component (D)), | |
| 0.3 part | defoamer (D-Foam-R C 741, from Clariant, component (D)), | |
| 0.2 part | preservative (Nipacide BSM, from Clariant, component (D)), | |
| 18 parts | water (component (E)) | |

The procedure in the production and testing of the pigment preparation is as detailed under example 1. After grinding, the pigment preparation is a fluid, foam-free pigment dispersion. After storage at 60° C. for one week, the pigment preparation has formed a sediment. The viscosity of the pigment preparation is 671 mPa·s.

Example 5 (comparative example)

| | | |
|---|---|---|
| 70 parts | C.I. Pigment Red 101 (Bayferrox Red 130, component (A)), | |
| 4 parts | coconut fatty acid ethoxylates with 10 mol of ethylene oxide (Genagen ® C 100, from Clariant, component (B)) | |
| 0.6 part | tallowalkylamine (Genamin TA 100, from Clariant, component (C)), | |
| 10 parts | polyethylene glycol having a molecular weight of 200 g/mol (Polyglykol 200 USP, from Clariant, component (D)), | |
| 0.2 part | acetic acid, 99% (component (D)), | |
| 0.3 part | defoamer (D-Foam-R C 741, from Clariant, component (D)), | |
| 0.2 part | preservative (Nipacide ® BSM, from Clariant, component (D)), | |
| 18 parts | water (component (E)) | |

The procedure in the production and testing of the pigment preparation is as detailed under example 1. After grinding, the pigment preparation is a fluid, foam-free pigment dispersion. After storage at 60° C. for one week, the pigment preparation has formed a sediment. The viscosity of the pigment preparation is 511 mPa·s.

Example 6

| | | |
|---|---|---|
| 70 parts | C.I. Pigment White 6 (Kronos Titanium Dioxide 2160, from Kronos, component (A)), | |
| 4 parts | tall oil fatty acid ethanolamide reacted with 5 mol of ethylene oxide (component (B)), | |
| 1 part | lauryldioxypropylamine, a reaction product of a $C_{12}/C_{14}$ fatty alcohol with 2 mol of propylene oxide and subsequent aminolysis to give the primary alkylpolyoxypropylamine amine (Genamin LA2P 100 D, from Clariant, component (C)), | |
| 10 parts | polyethylene glycol having a molecular weight of 200 g/mol (Polyglykol 200 USP, from Clariant, component (D)), | |
| 0.3 part | defoamer (D-Foam-R C 741, from Clariant, component (D)), | |
| 0.2 part | preservative (Nipacide BSM, from Clariant, component (D)), | |
| 14.5 parts | water (component (E)) | |

The procedure in the production and testing of the pigment preparation is as detailed under example 1. After storage at 60° C. for one week, the pigment preparation is fluid, homogeneous and foam-free. The viscosity of the pigment preparation is 1531 mPa·s.

Example 7

| | | |
|---|---|---|
| 65 parts | C.I. Pigment Yellow 42 (Bayferrox Yellow 3920, from Lanxess, component (A)), | |
| 4 parts | alkoxylate consisting of a saturated $C_{16}/C_{18}$ fatty alcohol reacted with 7 mol of propylene oxide and 9 mol of ethylene oxide (component (B)), | |
| 1 part | $C_{12}/C_{16}$ coconut alkyl amine (Genamin CC 100, from Clariant, component (C)), | |
| 10 parts | polyethylene glycol having a molecular weight of 200 g/mol (Polyglykol 200 USP, from Clariant, component (D)), | |
| 0.3 part | defoamer (D-Foam-R C 741, from Clariant, component (D)), | |
| 0.2 part | preservative (Nipacide BSM, from Clariant, component (D)), | |
| 19.5 parts | water (component (E)) | |

The procedure in the production and testing of the pigment preparation is as detailed under example 1. After storage at 60° C. for one week, the pigment preparation is fluid, homogeneous and foam-free. The viscosity of the pigment preparation is 2246 mPa·s.

Example 8

| | | |
|---|---|---|
| 70 parts | C.I. Pigment Green 17 (Chrome Oxide Green, from Lanxess, component (A)), | |
| 6 parts | alkoxylate consisting of a saturated $C_{16}/C_{18}$ fatty alcohol reacted with 7 mol of propylene oxide and 7 mol of ethylene oxide (component (B)), | |
| 1 part | $C_{12}/C_{16}$ coconut alkyl amine (Genamin CC 100, from Clariant, component (C)), | |
| 10 parts | polyethylene glycol having a molecular weight of 200 g/mol (Polyglykol 200 USP, from Clariant, component (D)), | |
| 0.3 part | defoamer (D-Foam-R C 741, from Clariant, component (D)), | |
| 0.2 part | preservative (Nipacide BSM, from Clariant, component (D)), | |
| 12.5 parts | water (component (E)) | |

The procedure in the production and testing of the pigment preparation is as detailed under example 1. After storage at 60° C. for one week, the pigment preparation is fluid, homogeneous and foam-free. The viscosity of the pigment preparation is 1995 mPa·s.

Example 9

| | | |
|---|---|---|
| 65 | parts | C.I. Pigment Blue 28 (Heucodur ® Blue 551, from Heubach, component (A)), |
| 6 | parts | alkoxylate consisting of a saturated $C_{16}/C_{18}$ fatty alcohol reacted with 7 mol of propylene oxide and 7 mol of ethylene oxide (component (B)), |
| 1 | part | $C_{12}/C_{16}$ coconut alkyl amine (Genamin CC 100, from Clariant, component (C)), |
| 10 | parts | polyethylene glycol having a molecular weight of 200 g/mol (Polyglykol 200 USP, from Clariant, component (D)), |
| 0.3 | part | defoamer (D-Foam-R C 741, from Clariant, component (D)), |
| 0.2 | part | preservative (Nipacide BSM, from Clariant, component (D)), |
| 17.5 | parts | water (component (E)) |

The procedure in the production and testing of the pigment preparation is as detailed under example 1. After storage at 60° C. for one week, the pigment preparation is fluid, homogeneous and foam-free. The viscosity of the pigment preparation is 1675 mPa·s.

Example 10

| | | |
|---|---|---|
| 70 | parts | C.I. Pigment Yellow 184 (Sicopal ® Yellow L 110, from BASF, component (A)), |
| 6 | parts | alkoxylate consisting of a saturated $C_{16}/C_{18}$ fatty alcohol reacted with 7 mol of propylene oxide and 7 mol of ethylene oxide (component (B)), |
| 1 | part | $C_{12}/C_{16}$ coconut alkyl amine (Genamin CC 100, from Clariant, component (C)), |
| 10 | parts | polyethylene glycol having a molecular weight of 200 g/mol (Polyglykol 200 USP, from Clariant, component (D)), |
| 0.3 | part | defoamer (D-Foam-R C 741, from Clariant, component (D)), |
| 0.2 | part | preservative (Nipacide BSM, from Clariant, component (D)), |
| 12.6 | parts | water (component (E)) |

The procedure in the production and testing of the pigment preparation is as detailed under example 1. After storage at 60° C. for one week, the pigment preparation is fluid, homogeneous and foam-free. The viscosity of the pigment preparation is 1542 mPa·s.

Example 11

| | | |
|---|---|---|
| 70 | parts | C.I. Pigment Red 101 (Bayferrox ® Red 130, from Lanxess, component (A)), |
| 6 | parts | tall oil fatty acid ethanolamide reacted with 10 mol of ethylene oxide (component (B)), |
| 1 | part | coconut amine (Genamin ® CC 100, from Clariant, component (C)), |
| 10 | parts | polyethylene glycol having a molecular weight of 200 g/mol (Polyglykol 200 USP, from Clariant, component (D)), |
| 0.3 | part | defoamer (D-Foam-R C 741, from Clariant, component (D)), |
| 0.2 | part | preservative (Nipacide ® BSM, from Clariant, component (D)), |
| 12.5 | parts | water (component (E)) |

The procedure in the production and testing of the pigment preparation is as detailed under example 1. After storage at 60° C. for one week, the pigment preparation is fluid, homogeneous and foam-free. The viscosity of the pigment preparation is 1967 mPa·s.

Example 12

| | | |
|---|---|---|
| 70 | parts | C.I. Pigment Red 101 (Bayferrox ® Red 130, from Lanxess, component (A)), |
| 6 | parts | tall oil fatty acid ethanolamide reacted with 15 mol of ethylene oxide (component (B)), |
| 1 | part | coconut amine (Genamin ® CC 100, from Clariant, component (C)), |
| 10 | parts | polyethylene glycol having a molecular weight of 200 g/mol (Polyglykol 200 USP, from Clariant, component (D)), |
| 0.3 | part | defoamer (D-Foam-R C 741, from Clariant, component (D)), |
| 0.2 | part | preservative (Nipacide ® BSM, from Clariant, component (D)), |
| 12.5 | parts | water (component (E)) |

The procedure in the production and testing of the pigment preparation is as detailed under example 1. After storage at 60° C. for one week, the pigment preparation is fluid, homogeneous and foam-free. The viscosity of the pigment preparation is 1285 mPa·s.

Example 13

| | | |
|---|---|---|
| 65 | parts | C.I. Pigment Yellow 42 (Bayferrox ® Yellow 3920, from Lanxess, component (A)), |
| 6 | parts | tall oil fatty acid ethanolamide reacted with 10 mol of ethylene oxide (component (B)), |
| 1 | part | coconut amine (Genamin ® CC 100, from Clariant, component (C)), |
| 10 | parts | polyethylene glycol having a molecular weight of 200 g/mol (Polyglykol 200 USP, from Clariant, component (D)), |
| 0.3 | part | defoamer (D-Foam-R C 741, from Clariant, component (D)), |
| 0.2 | part | preservative (Nipacide ® BSM, from Clariant, component (D)), |
| 17.5 | parts | water (component (E)) |

The procedure in the production and testing of the pigment preparation is as detailed under example 1. After storage at 60° C. for one week, the pigment preparation is fluid, homogeneous and foam-free. The viscosity of the pigment preparation is 1053 mPa·s.

Example 14

| | | |
|---|---|---|
| 65 | parts | C.I. Pigment Yellow 42 (Bayferrox ® Yellow 3920, from Lanxess, component (A)), |
| 6 | parts | tall oil fatty acid ethanolamide reacted with 15 mol of ethylene oxide (component (B)), |
| 1 | part | coconut amine (Genamin ® CC 100, from Clariant, component (C)), |
| 10 | parts | polyethylene glycol having a molecular weight of 200 g/mol (Polyglykol 200 USP, from Clariant, component (D)), |
| 0.3 | part | defoamer (D-Foam-R C 741, from Clariant, component (D)), |
| 0.2 | part | preservative (Nipacide ® BSM, from Clariant, component (D)), |
| 17.5 | parts | water (component (E)) |

The procedure in the production and testing of the pigment preparation is as detailed under example 1. After storage at 60° C. for one week, the pigment preparation is fluid, homogeneous and foam-free. The viscosity of the pigment preparation is 1365 mPa·s.

Example 15

| | | |
|---|---|---|
| 65 | parts | C.I. Pigment Black 11 (Bayferrox ® Black 316, from Lanxess, component (A)), |

Example 15

| | | |
|---|---|---|
| 6 parts | tall oil fatty acid ethanolamide reacted with 10 mol of ethylene oxide (component (B)), |
| 1 part | coconut amine (Genamin ® CC 100, from Clariant, component (C)), |
| 10 parts | polyethylene glycol having a molecular weight of 200 g/mol (Polyglykol 200 USP, from Clariant, component (D)), |
| 0.3 part | defoamer (D-Foam-R C 741, from Clariant, component (D)), |
| 0.2 part | preservative (Nipacide ® BSM, from Clariant, component (D)), |
| 17.5 parts | water (component (E)) |

The procedure in the production and testing of the pigment preparation is as detailed under example 1. After storage at 60° C. for one week, the pigment preparation is fluid, homogeneous and foam-free. The viscosity of the pigment preparation is 1103 mPa·s.

Example 16

| | | |
|---|---|---|
| 65 parts | C.I. Pigment Black 11 (Bayferrox ® Black 316, from Lanxess, component (A)), |
| 6 parts | tall oil fatty acid ethanolamide reacted with 15 mol of ethylene oxide (component (B)), |
| 1 part | coconut amine (Genamin ® CC 100, from Clariant, component (C)), |
| 10 parts | polyethylene glycol having a molecular weight of 200 g/mol (Polyglykol 200 USP, from Clariant, component (D)), |
| 0.3 part | defoamer (D-Foam-R C 741, from Clariant, component (D)), |
| 0.2 part | preservative (Nipacide ® BSM, from Clariant, component (D)), |
| 17.5 parts | water (component (E)) |

The procedure in the production and testing of the pigment preparation is as detailed under example 1. After storage at 60° C. for one week, the pigment preparation is fluid, homogeneous and foam-free. The viscosity of the pigment preparation is 844 mPa·s.

Example 17

| | | |
|---|---|---|
| 70 parts | C.I. Pigment White 6 (Kronos ® Titanium Dioxide 2160, from Kronos, component (A)), |
| 6 parts | tall oil fatty acid ethanolamide reacted with 10 mol of ethylene oxide (component (B)), |
| 1 part | coconut amine (Genamin ® CC 100, from Clariant, component (C)), |
| 10 parts | polyethylene glycol having a molecular weight of 200 g/mol (Polyglykol 200 USP, from Clariant, component (D)), |
| 0.3 part | defoamer (D-Foam-R C 741, from Clariant, component (D)), |
| 0.2 part | preservative (Nipacide ® BSM, from Clariant, component (D)), |
| 12.5 parts | water (component (E)) |

The procedure in the production and testing of the pigment preparation is as detailed under example 1. After storage at 60° C. for one week, the pigment preparation is fluid, homogeneous and foam-free. The viscosity of the pigment preparation is 1539 mPa·s.

Example 18

| | | |
|---|---|---|
| 70 parts | C.I. Pigment White 6 (Kronos ® Titanium Dioxide 2160, from Kronos, component (A)), |
| 6 parts | tall oil fatty acid ethanolamide reacted with 15 mol of ethylene oxide (component (B)), |

Example 18

| | | |
|---|---|---|
| 1 part | coconut amine (Genamin ® CC 100, from Clariant, component (C)), |
| 10 parts | polyethylene glycol having a molecular weight of 200 g/mol (Polyglykol 200 USP, from Clariant, component (D)), |
| 0.3 part | defoamer (D-Foam-R C 741, from Clariant, component (D)), |
| 0.2 part | preservative (Nipacide ® BSM, from Clariant, component (D)), |
| 12.5 parts | water (component (E)) |

The procedure in the production and testing of the pigment preparation is as detailed under example 1. After storage at 60° C. for one week, the pigment preparation is fluid, homogeneous and foam-free. The viscosity of the pigment preparation is 633 mPa·s.

The invention claimed is:

1. An aqueous pigment preparation comprising
(A) 30 to 75% by weight of at least one inorganic white pigment or chromatic pigment or a mixture of various inorganic white pigments or chromatic pigments,
(B) 0.01 to 15% by weight of at least one fatty acid ethanolamide ethoxylate of the formula (I),

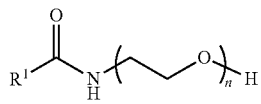

in which
$R^1$ is a linear or branched alkyl or alkenyl radical having 7 to 21 carbon atoms,
n is an integer from 2 to 40,
(C) 0.01 to 5% by weight of at least one amine of the formula (II)

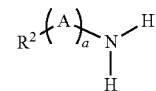

in which
$R^2$ is a linear or branched alkyl or alkenyl radical having 8 to 22 carbon atoms, the same as or different than $R^1$,
A is an iminopropyl group —NH—$CH_2$—$CH_2$—$CH_2$—, an oxyethyl group —O—$CH_2$—$CH_2$— or an oxypropyl group —O—$CH_2$—$CH(CH_3)$—$CH_2$—,
and
a is an integer from 0 to 5,
where the compound of the formula (II) may be in the form of an ammonium salt, and
(E) water.

2. The aqueous pigment preparation as claimed in claim 1, in which the fatty acid ethanolamide ethoxylate of the formula (I) has been prepared by addition of ethylene oxide onto a fatty acid ethanolamide, and n is an integer from 3 to 40.

3. The aqueous pigment preparation as claimed in claim 1, in which A is —NH—$CH_2$—$CH_2$—$CH_2$ and a is 1.

4. The aqueous pigment preparation as claimed in claim 1, in which A is —O—CH$_2$—CH$_2$— or —O—CH$_2$—CH(CH$_3$)—CH$_2$— and a is an integer from 1 to 5.

5. The aqueous pigment preparation as claimed in claim 1, containing 1 to 10% by weight of a fatty acid ethanolamide ethoxylate of the formula (I).

6. The aqueous pigment preparation as claimed in claim 1, containing 0.1 to 2% by weight of an amine of the formula (II).

7. The aqueous pigment preparation as claimed in claim 6, in which, in formula (II), a=0.

8. The aqueous pigment preparation as claimed in claim 1, containing 10 to 65% by weight of water.

9. The aqueous pigment preparation as claimed in claim 1, in which R$^1$ comprises 11 to 19 carbon atoms.

10. The aqueous pigment preparation as claimed in claim 1, in which R$^2$ comprises 12 to 20 carbon atoms.

11. The aqueous pigment preparation as claimed in claim 1, having a viscosity of 10 to 10,000 mPas, wherein the viscosity is determined with a cone/plate viscometer at a shear rate of $\frac{1}{60}$ sec$^{-1}$.

12. The aqueous pigment preparation as claimed in claim 1, further comprising (D) up to 30% by weight of at least one auxiliary customary for the production of aqueous pigment preparations, selected from the group consisting of wetting agents, anionic dispersants, humectants, solvents, defoamers, rheology additives, preservatives, buffer substances, and pH regulators.

13. The aqueous pigment preparation as claimed in claim 12, containing up to 15% by weight of at least one humectant or solvent, selected from the group consisting of glycol ethers having a mean molecular weight of 200 to 20,000 g/mol.

14. The aqueous pigment preparation as claimed in claim 12, containing up to 2% by weight of defoamer.

15. The aqueous pigment preparation as claimed in claim 12, containing up to 1% by weight of an in-can preservative.

16. A macromolecular material, a coating composition, a lacquer or a paint, comprising at least one aqueous pigment preparation as claimed in claim 1.

17. A two-dimensional sheet structure comprising at least one aqueous pigment preparation as claimed in claim 1.

18. A process for coloring a macromolecular material, a coating composition, a lacquer or a paint, comprising the step of adding an aqueous pigment preparation comprising (A) 30 to 75% by weight of at least one inorganic white pigment or chromatic pigment or a mixture of various inorganic white pigments or chromatic pigments, (B) 0.01 to 15% by weight of at least one fatty acid ethanolamide ethoxylate of the formula (I),

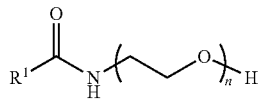

(I)

in which
R$^1$ is a linear or branched alkyl or alkenyl radical having 7 to 21 carbon atoms,
n is an integer from 2 to 40, (C) 0.01 to 5% by weight of at least one amine of the formula (II)

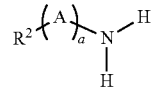

(II)

in which
R$^2$ is a linear or branched alkyl or alkenyl radical having 8 to 22 carbon atoms, the same as or different than R$^1$,
A is an iminopropyl group —NH—CH$_2$—CH$_2$—CH$_2$—, an oxyethyl group —O—CH$_2$—CH$_2$— or an oxypropyl group —O—CH$_2$—CH(CH$_3$)—CH$_2$—,
and
a is an integer from 0 to 5,
where the compound of the formula (II) may be in the form of an ammonium salt, and (E) water to the macromolecular material, the coating composition, the lacquer or the paint.

\* \* \* \* \*